Aug. 11, 1970   R. B. BAIRD ET AL   3,523,683
APPARATUS FOR INJECTING FLUID FUEL INTO A BLAST FURNACE
Original Filed Dec. 2, 1964   3 Sheets-Sheet 1
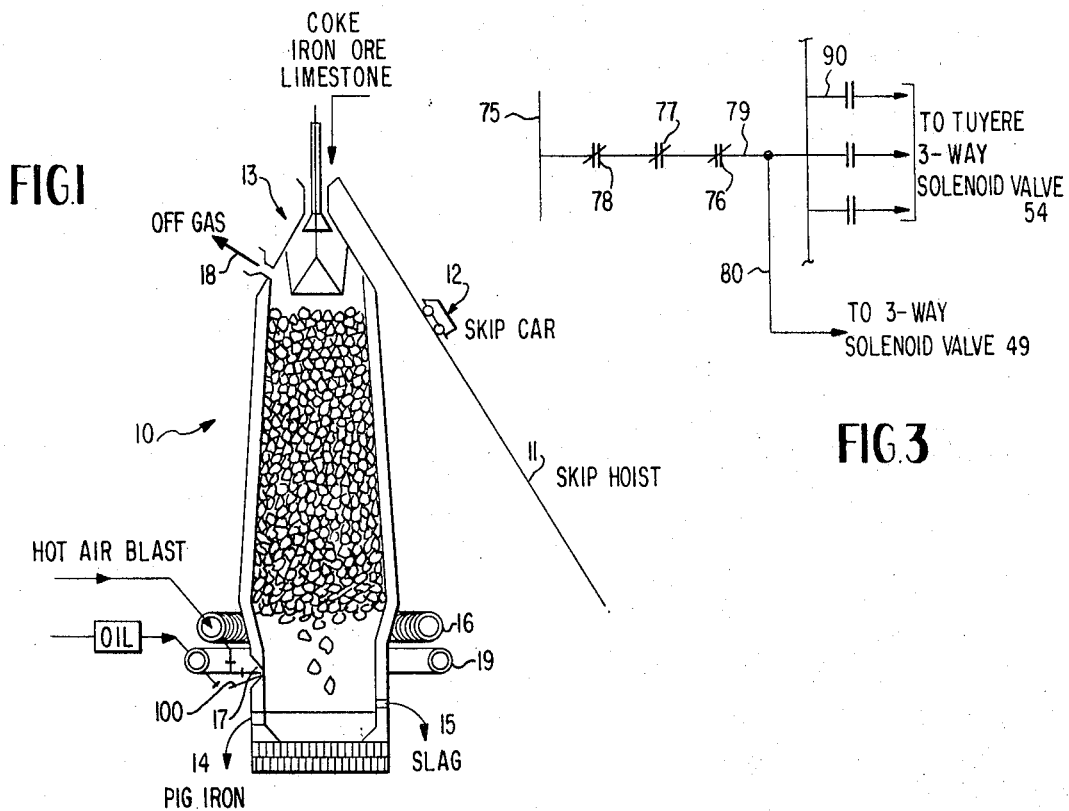
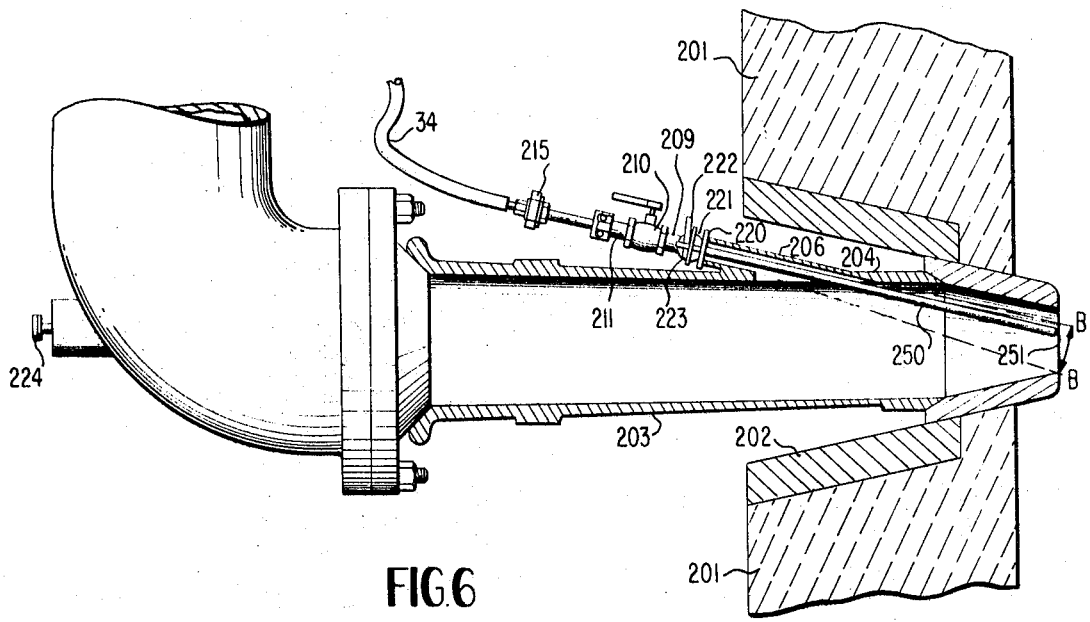
INVENTOR
ROGER B. BAIRD
FRANK J. BRUNS
BARNEY VALLINO JR
BY McLean and Dibble
ATTORNEY

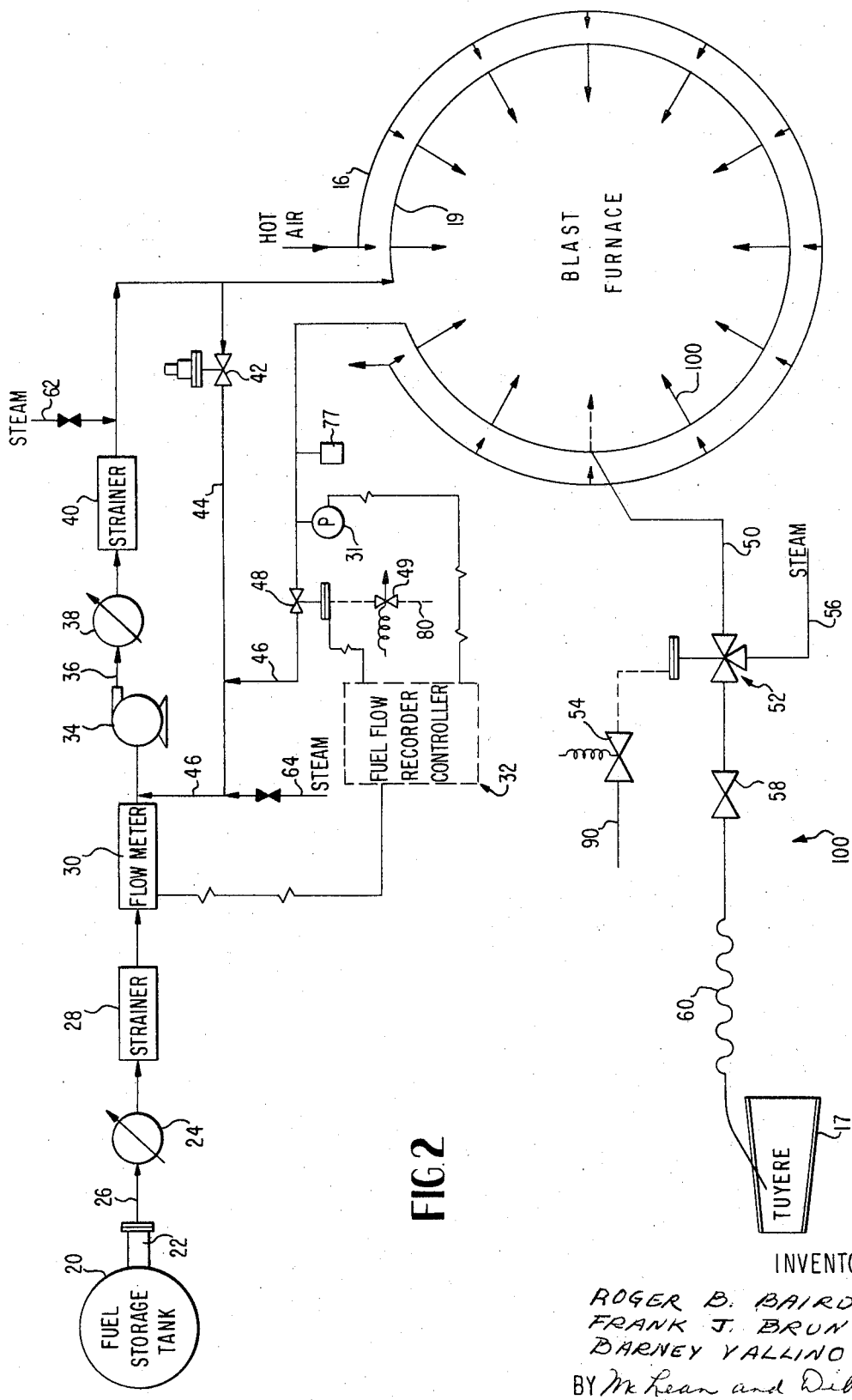

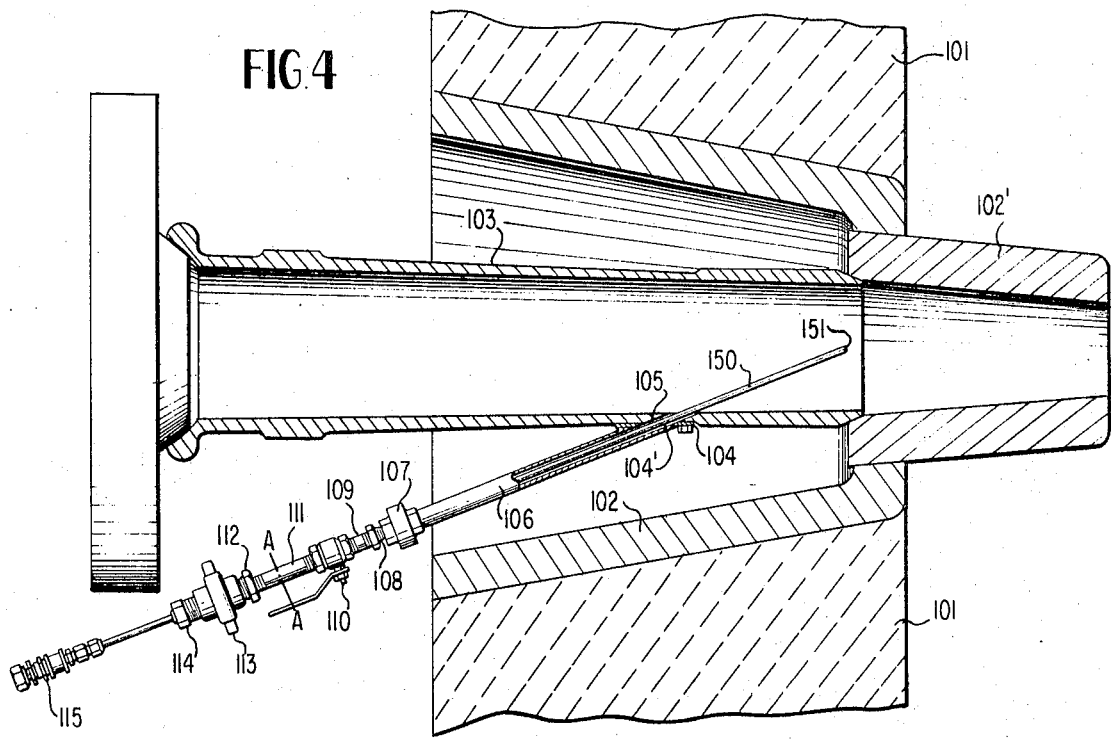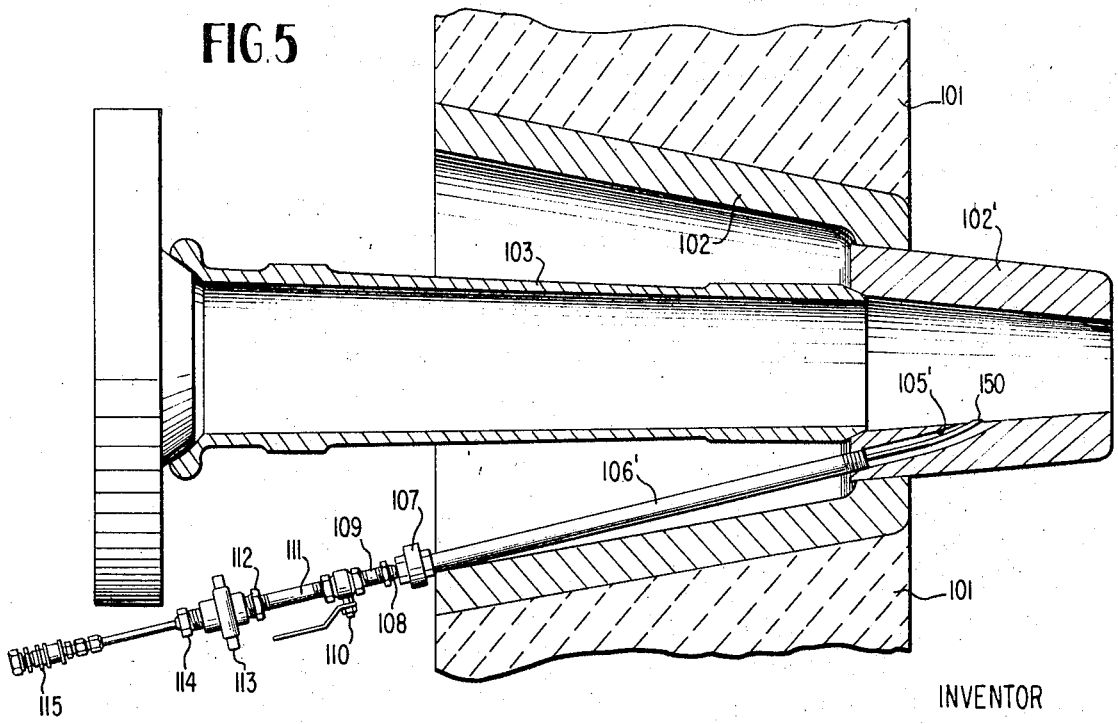

United States Patent Office 3,523,683
Patented Aug. 11, 1970

3,523,683
APPARATUS FOR INJECTING FLUID FUEL
INTO A BLAST FURNACE
Roger B. Baird, Palos Park, Frank J. Bruns, Homewood, and Barney Vallino, Jr., Chicago Heights, Ill., assignors to Sinclair Research, Inc., New York, N.Y., a corporation of Delaware
Continuation of application Ser. No. 415,373, Dec. 2, 1964. This application Mar. 18, 1968, Ser. No. 714,112
Int. Cl. C21b 7/16
U.S. Cl. 266—30           10 Claims

ABSTRACT OF THE DISCLOSURE

System for injecting a fluid fuel into a blast furnace having at least one tuyere and means for supplying a blast of hot air to said tuyere comprising an injection lance means for injecting fluid fuel into said air blast through a part of the furnace at the tuyere having an opening and means for supplying fluid fuel to the lance means, comprising storage means for the fuel, means for conducting fuel under pressure from the storage means to the lance means including means for recycling fuel around the furnace, and regulating means in the conducting means for regulating the amount of fuel supplied to the furnace through the lance means including valve means in the recycle means and automatic control means for adjusting the valve means to vary the pressure in the recycle means and balance the amount of fuel drawn from said storage means and the pressure of fuel in said recycle means to maintain a predetermined flow of fuel through said lance means. The injection lance means includes conduit means connected to the conducting means, three-way valve means connected in the conduit means at two of the three ways, steam supply means connected to the said conduit means in the third-way of the three-way valve means, and means for automatically controlling the three-way valve means to prevent oil flow through and to pass stream through the injection lance means upon a fluid fuel pressure failure. The means for automatically controlling the three-way valve means also includes means to prevent oil flow through and to pass steam through the injection lance means upon failure of the means for supplying the blast of hot air. The injection means comprises an injection lance, guide means attached to the said part over the opening including means for supporting the lance and means for preventing flow from the furnace through said opening with the lance being removably inserted into the air blast through the guide means and said opening.

---

This application is a continuation of U.S. patent application, Ser. No. 415,373 filed Dec. 2, 1964, now abandoned.

The present invention relates to an improved apparatus for the injection of fluid hydrocarbon fuels into a blast furnace and more particularly with an apparatus for the injection of petroleum fuels, e.g. fuel oil, into blast furnaces through an injection lance especially adapted for this purpose.

Suitable fuels for this purpose include liquid, liquefiable, gaseous or emulsifiable hydrocarbon fuel products, such as petroleum-type residual fuel oils; distillate fuel oils derived from crude petroleum by distillation, thermal cracking, catalytic, cracking, hydroforming and the like; crude petroleum; shale oils, diesel fuels; gas oils; kerosene; gasoline; and petroleum naphthas. For economic reasons, those liquid fuel oils of ASTM Specification D-396-48T will generally be preferred with the residual fuel oils 5 and 6, called Bunker C fuels, being especially preferred. In some geographic areas, circumstances will justify the use of the more volatile liquid petroleum products other than residual fuel oils.

The basic reason for injecting fluid fuels, e.g., petroleum fuels into a blast furnace is to save money by replacing some of the coke required in the process. The amount of oil required to replace a pound of coke varies with furnace conditions. A typical amount is about 0.6 pound of fuel oil to replace a pound of coke. This has been achieved at blast temperatures of from about 1200° up to about 1700° F. with oil injection rates ranging from about 5 to 30 gal./ton hot metal. Other advantages in addition to coke replacement which have been reported pertain to smoother working of the furnace. The descent of the burden is facilitated as in steam injection without the thermal loss of steam injection. Production rate increases have been achieved because of a higher ore-coke ratio in the furnace volume.

Although oil has ben commercially injected into blast furnaces no completely satisfactory injector has been developed since the injection of hydrocarbon fuels, particularly liquid petroleum fuels, is accompanied by certain problems not present inconventional injection systems. In the first place, the injection apparatus and system employed must be capable of uniformly injecting fuel into the blast furnace over a wide range of flow rates. For example, the oil should be injected at sufficient velocity to prevent its being heated to above 650° F. in the injection device which would cause it to coke up and plug the injector. Also, the oil should be injected at a point which will allow complete combustion before the products of combustion enter the incandescent coke bed in the blast furnace. Since this distance varies with the temperature of the blast and the degree of oxygen enrichment of the blast, it is desirable to have an injector which can be variably positioned to meet changes in furnace operating conditions. Further, it is desirable to inject the oil at such a point that impingement of unburned oil on the walls of the various portions of the blast furnace and tuyeres is avoided because this oil is slow to burn and often will wastefully accumulate and coke up in the tuyere of the blast furnace.

With these precepts in mind, it is a primary object of the present invention to provide an improved apparatus for injecting the fuel into the blast furnace. In general, the apparatus of the present invention comprises an oil injection lance entering into the hot air blast at a relatively small angle of 5° to 45°, preferably 15° to 20°, relative to the direction of flow thereof through the tuyere nose, the side wall of the blow pipe or the tuyere of the furnace forward of the point of attachment to the blowpipe. In a preferred embodiment this lance can be formed by a pipe of small diameter passing through a pipe of larger diameter which larger pipe is rigidly attached to the tuyere and forms a guide means for the smaller pipe. In a modified embodiment, the lance or smaller diameter pipe may extend through a passage formed in the refractory tuyere nose. Other arrangements may also be used. In both embodiments, ball valve means supported at the free end of the guide means allows the lance, which extends therethrough, to be quickly withdrawn from the area of the tuyere with a minimum of blast air escaping. Also, packing and sealing means can be attached to the guide means in either embodiment so that the length of the lance pipe can be varied. In a further modification of the present invention, ball joint means through which the lance pipe extends can be arranged at the open end of the guide means for mounting the lance pipe so that the lance pipe additionally can be rotated while in the tuyere. A locking device on the ball joint fixes the position of the lance in the tuyere.

The fuel, e.g. fuel oil, can be injected into the blast furnace in conjunction with the heated blast air which may have, for instance, a temperature in the range of about 1000 to 2000° F., a pressure in the range of about 10 to 40 p.s.i.g., and a velocity in the range of about 75–100 m.p.h., either through the tuyeres or near the tuyeres into the lower or bosh portion of the blast furnace to produce high temperatures and suitable reducing gases. Advantageously, the fuel can be injected at the tuyere nose or injected at some point in the blow pipe arranged at the tuyere through which the hot air blast is supplied to the blast furnace.

The fluid fuel injection system of the present invention does not have to atomize the fuel, e.g., heavy liquid fuel such as fuel oil, to properly burn the same, but the fuel can be injected into the tuyere in a solid stream through the injection lance. The supply system for the fuel includes provision for storing, heating, pumping and metering the fuel to a header at the blast furnace. Metering of the fuel may be accomplished by metering pumps or flow control valves in combination with a conventional pump. The pressure maintained in the fuel header is sufficient to inject the fuel oil into the hot air blast and is usually from about 20 to 90 p.s.i. In general, the fuel is heated at injection to a temperature of from 150° to 200° F. Preferably the fuel oil is more or less completely combusted prior to entering the incandescent coke bed in the furnace.

The system of the present invention can also include means for purging the lance pipe if the fuel flow is stopped for any reason. A compressed air or steam purge can be used for this purpose. In addition, means can be provided for automatically stopping the fuel flow if the air blast is cut for the whole furnace, or an individual tuyere.

The present invention will be further described with reference to the attached drawings in which:

FIG. 1 schematically illustrates a blast furnace incorporating a lance system in accordance with the present invention;

FIG. 2 is a general flow sheet for the blast furnace and injection means of FIG. 1;

FIG. 3 shows an electric control schematic diagram for the flow sheet of FIG. 2;

FIG. 4 shows the details of an oil injection lance constructed in accordance with the present invention;

FIG. 5 shows a modification of the lance of the present invention; and

FIG. 6 shows a further modification of the lance of the present invention.

Referring now to FIG. 1, coke, ore and limestone are carried to the top of the furnace 10, which may be, for instance, 20 stories high, by skip cars 12 on the skip hoist 11 and dumped into the furnace 10 through the double bell hopper arrangement 13. Through combustion of the coke, the iron ore is heated and reduced into molten pig iron. Periodically the pig iron is drawn off the bottom of the furnace 10 as illustrated at 14, as is the slag 15 which contains the impurities. Air for combustion of the coke is preheated in stoves (not shown) and then injected into the blast furnace from the large diameter bustle pipe 16 which encircles the furnace 10 through the tuyeres 17 which are spaced radially around the circumference. Off gases 18 are removed from the furnace. These gases are at about 300° F. and may be used as fuel in the stoves which preheat the hot blast air.

In accordance with the present invention, a fluid fuel, e.g., fuel oil is used to replace some of the coke supplied to the furnace. Oil is introduced into the furnace 10 through the lance system, generally designated 100, from an oil header 19. In the blast furnace the products of combustion of the oil actually enter into the ore smelting reaction, in contrast to the open hearth where the combustion of added oil only provides heat.

Referring now to FIG. 2, fuel, i.e. oil, is drawn from storage tank 20 which can contain tank heater 22 and passed through heater 24 and strainer 28 in conduit 26. Heater 24 preheats the oil to 150–200° F. The oil is pumped from heater 24 through meter 30 in line 26 which measures the total oil used by the system by pump 34 and then through line 36, heater 38 and strainer 40 into the header 19 surrounding the furnace 10. The amount of oil pumped through line 26 as measured by meter 30 is recorded on the recorder controller 32. Smaller pipes carry the oil from header 19 to the tuyere injectors, generally designated as 100, one of which is illustrated in detail.

Pressure relief valve 42 in line 44 bypasses header 19 when the pressure therein exceeds a predetermined amount by passing oil through line 44 to the oil return line 46 which returns the oil to line 26. The amount of oil injected from header 19 is varied by varying the pressure on the header as determined by pressure control valve 48. The setting for the control valve 48 is made by the recorder-controller instrument 32 and the valve is additionally controlled by solenoid 49 as discussed below. An excess of oil is circulated around the furnace to keep the system hot and clean. Steam purges 62 and 64 are provided for conduits 36 and 46, respectively.

Each of the injectors 100 through which oil flows from oil header 19, only one of which is shown in FIG. 2, comprises a flow line 50 connected to header 19 and including a three-way valve 52, e.g., a diaphragm operated valve controlled by solenoid 54. Valve 52 is connected to a steam line 56 in the third way thereof. If the oil flow should be interrupted for any reason, such as when the blast air flow is stopped or oil header pressure falls, valve 52 automatically switches to steam line 56 and the oil from this point to the tuyere is purged from the system to reduce the possibility of fuel coking and plugging in the lance. A manual regulating valve 58 in line 50 balances the oil distribution to the various individual tuyeres. Precise flow control is achieved by varying the header pressure with the main control valve 48. A flexible metal hose 60 connects line 50 to the injection lance for the tuyere which is described in detail hereinbelow.

The operation of the oil supply system of FIG. 2 is as follows: The control system controls the total oil feed to all the tuyeres and changes the amount of total flow by either increasing or decreasing the pressure on the oil header 19 from which the tuyeres are fed. Pressure transmitter 31 is connected to the recorder-controller 32 to provide a reading of the pressure in recycle conduit 46 upstream of valve 48. The flow meter 30 measures the amount of oil passing from the tank 20 to the suction of pump 34. This is the same quantity fed at the tuyeres. The meter 30 transmits an electrical signal which the control instrument 32 receives and records, e.g. in gal./ minute. The controller 32 then senses the relation of the flow to a predetermined set point, i.e., the desired quantity of oil at the tuyere and transmits a signal to the control valve 48 in circulating oil return line 46 which valve changes the pressure on the header 19 around the furnace 10. The valve 48 closes to increase header pressure thus increasing flow to the tuyeres through lines 50 and opens to decrease pressure and decrease the flow to the tuyeres.

FIG. 3 illustrates a part of the electrical system for the oil supply system of FIG. 2. Upon wind failure, pressure switch 76 located in the cold blast main, not shown, will automatically trip causing the following operation to take place. All the three-way control valves 52 in the lines 50 which feed oil to the tuyeres will be opened by their respective solenoids 54, connected to the power line by electrical lines 90, cutting off oil flow through lines 50 and introducing steam into the lances through the individual lines 56. The flow control valve 48 in the line 46, connected to the power line by electrical line 80, will open reducing the pressure on the oil header 19. Upon restoration of wind the system will automatically revert to normal. Upon oil pressure failure, pressure switch 77 in line 46, see FIG. 2, will automatically trip causing the system to respond in the same manner as under wind failure. Restortaion of the oil pressure will automatically restore the system to normal control. Master switch 78 can quickly shut down the system if desired. This will cause the system to operate as indicated under wind failure above. The system will operate this way until the switch is turned on again causing the system to return to normal. All solenoid valves are selected to operate so that the system will automatically be caused to respond as with wind failure above in the event of a power failure.

A preferred embodiment of the lance is shown by FIG. 4. As illustrated, the blast furnace wall 101 includes tuyeres 102, only one of which is illustrated. Tuyere 102 has a blowpipe 103 arranged thereat. Plate 104, e.g. of steel, is rigidly connected to the side of blowpipe 103, e.g. by bolts, so as to cover an opening 105 therein and guide pipe 106 is welded to plate 104 at an angle with respect to the surface thereof. Plate 104 has a curved surface in order to fit tightly against blowpipe 103 and an opening 104' which fits over opening 105 in the blowpipe. The angle of attachment of guide pipe 106 to plate 104 is determined principally by the length of the blowpipe and clearance around the furnace but is preferably a low angle, e.g. 5° to 45°, preferably 15° to 20°. Pipe 106 guides and supports lance pipe 150 which has a smaller outside diameter than the inside diameter of pipe 106. For example, the pipe 106 can have an inside diameter of ¾" and lance pipe 150 an outer diameter of ¼". Union 107 which is attached to the free end of pipe 106 has bushing 108 threaded therein. Bushing 108 supports connecting pipe 109 and valve 110, e.g. a ball-type valve. Connecting pipe 111, bushing 112, handle bar union 113 and packing gland 114 are connected to the other side of valve 110. The packing gland 114 is fitted with a high temperature asbestos packing or alternatively can be of O-ring construction.

In use, lance pipe 150 is inserted through packing gland 114, pipe 111, valve 110, pipe 109 and the guide pipe 106 and opening 105 into the blowpipe 103. The packing gland is then tightened and the system is ready for the flexible metal hose 60, see FIG. 2, to be connected to the quick-disconnect coupling 115 which places the system in readiness for operation. It is unnecessary to shut down the furnace or hot air blast for either insertion or removal of the lance 150 since valve 110 is arranged to close pipe 106. When it is desired to either remove or insert the lance pipe 150 while the hot air blast is flowing through blowpipe 103, the tip 151 of lance pipe 150 is removed or inserted, respectively, to the position of line A—A, FIG. 4, and valve 110 then closed or opened to allow, respectively, removal or insertion of lance pipe 150 without the loss of substantial air from blowpipe 103.

The length of lance pipe 150 in the blowpipe 103, i.e., the position of tip 151 in the blowpipe 103, can be varied to adjust the point at which the fuel oil is injected by adjusting the effective length of connecting pipe 111, and/or connecting pipe 109, e.g. by changing the actual length thereof or the distance the respective pipes are threaded into bushings 108 and 112.

FIG. 5 illustrates a modification of the lance system similar to that of FIG. 4 wherein a guide pipe 106', corresponding to guide pipe 106 of FIG. 4, is attached to a curved passage 105' in the tuyere nose 102'. Lance pipe 150' which has a curved tip to provide an angle of entry for the oil is inserted through the passage 105' in the manner discussed above with respect to lance pipe 150 of FIG. 4. The remainder of the system is similar to that illustrated in FIG. 4.

Referring now to FIG. 6 which shows a further modification of the lance, furnace wall 201, tuyere 202 and blowpipe 203 are shown with oil injection lance pipe 250 of small diameter entering through the side wall of the blowpipe. In the design of FIG. 6, the opening for the lance pipe 250 in the sidewall of the blowpipe wall is a longitudinal slot or opening of sufficient diameter to pass the lance pipe and allow rotational movements thereof as discussed hereinbelow. The slot is sealed by plate 204 which carries guide pipe or nozzle 206 welded or brazed thereto. Nozzle 206 may also be cast integrally with the blowpipe, if desired, as may guide pipe 106 of FIG. 4.

The outer flange face 220 of the hollow nozzle is concave and spherically machined to accommodate ball joint 221, to which valve 210 is attached. Ball joint 221 is held against the flange by a holddown ring 222, which is secured by quick release lugs 223. The valve 210 can be a gate valve but preferably is a quick opening plug or ball valve. Packing gland 214, which seals lance pipe 250 into the nozzle is attached to valve 210. A conventional quick disconnect fitting 215 connects the lance pipe 250 to flexible hose 34 of the oil supply, see FIG. 3.

Lance pipe 250 is inserted into or removed from the blowpipe 203 by placing the tip 251 of the pipe at point A—A, see FIG. 6, and opening or closing valve 210 in the manner described with reference to lance pipe 150, see FIG. 4. However, the angle of entry of lance pipe 250 may also be changed by loosening lugs 223 and rotating the ball joint 220 within a circle having a maximum diameter B—B. The diameter B—B is determined by the size of the opening in the wall of blowpipe 203 and the size of the guide pipe 206 which limits rotation of lance pipe 250 by ball joint 221. Diameter B—B also varies with the length of lance pipe 250 in blowpipe 203. The length of lance pipe 250 in blowpipe 203 may be changed by loosening the packing gland 214 and moving the lance in or out or by adjusting the effective length of pipes 209 or 211 as discussed above with respect to pipes 109 and 111, FIG. 4. The position of the lance may be observed through peepsight 224.

Various modifications and changes of the apparatus of the present invention, as illustrated, will be obvious to one skilled in the art. Such modifications include placing the heater in the storage tank, use of metering pumps, etc. Accordingly, it is to be understood that the present invention includes such modification and changes as are obvious to one skilled in the art and within the scope of the following claims.

It is claimed:

1. A system for injecting a fluid fuel into a blast furnace having at least one tuyere and means for supplying a blast of hot air to said tuyere comprising an injection lance means for injection fluid fuel into a supplied air blast through a part of said furnace at said tuyere having an opening therein and means for supplying fluid fuel to said lance means, said last-named means comprising first conduit means adapted for connection to a source of fluid fuel to conduct fuel from said source and including flow meter means for measuring the amount of fuel conducted from said source, a circulatory closed feed loop conduit connected to said first conduit means and encircling the blast furnace for receiving fuel from said first conduit means and for continuously circulating fuel under pressure through said circulatory closed feed loop conduit to provide a continuous supply of fluid fuel throughout said circulatory closed feed loop conduit, said circulatory closed feed loop conduit including vlave means coupled to said flow meter means to control fluid pressure in said circulatory feed loop conduit in accordance with the amount of fuel conducted from said source, and third conduit means connected to said feed loop conduit and to said lance means for conducting fuel from said feed loop conduit to said lance means.

2. System as defined in claim 1 wherein the injection lance means includes said third conduit means, three-way valve means connected in said third conduit means at two of the three ways, steam supply means connected to said three-way valve means in the third way thereof, and further including means for automatically controlling said three-way valve means to prevent oil flow through and to pass steam through said injection lance means upon a fluid fuel pressure failure in said feed loop.

3. System as defined in claim 2 further including means for automatically controlling said three-way valve means to prevent oil flow through and to pass steam through said injection lance means upon failure of said means for supplying said blast of hot air to said tuyere.

4. System as defined in claim 1 wherein said injection means comprises an injection lance, guide means attached to said part over said opening including means for supporting said lance and means for preventing flow from said furnace through said opening, said lance being removably inserted into said air blast through said guide means and said opening.

5. The apparatus of claim 4 wherein said guide means further includes means for adjusting the effective length of said lance on said guide means.

6. The apparatus of claim 4 wherein said guide means further includes means for adjusting the angular position of said lance in said opening.

7. System for injecting a fluid fuel into a blast furnace having at least one tuyere and means for supplying a blast of hot air to said tuyere comprising:
an injection lance means for injecting fluid fuel into said air blast through a part of said furnace at said tuyere having an opening therein, said injection lance means comprising an injection lance, guide means attached to said part over said opening, said guide means including a guide pipe for supporting said lance and having an inside diameter larger than the outside diameter of said lance and ball valve means connected to said guide pipe through which said lance extends for preventing flow from said furnace through said opening, whereby said lance is removably inserted into said air blast through said guide means and said opening; and
means for supplying fluid fuel to said lance means, said last-mentioned means comprising first conduit means for said fuel arranged to provide a feed loop including means for conducting fuel under pressure through the feed loop, second conduit means operatively interconnecting the lance means to said feed loop, third conduit means for conducting fuel from a source thereof to the feed loop, and regulating means for regulating the amount of fuel supplied to said furnace through said lance means including flow meter means in said third conduit means for measuring the amount of fuel introduced into the feed loop, valve means in said feed loop and automatic control means for receiving a signal from the flow meter means indicative of said amount of fuel and for controlling the valve means in response to said amount of fuel to vary the pressure in the feed loop and thereby the amount of fuel discharged through the lance means to maintain a predetermined flow of fuel through the lance means.

8. The apparatus of claim 7 further including means for adjusting the effective length of said lance comprising means for supporting said lance exteriorly of said ball valve means and removable spacer means between said supporting means and said ball valve means.

9. The apparatus of claim 8 further including means for adjusting the angular position of said lance in said opening comprising ball joint means supporting said lance and said valve means at the free end of guide means, said lance extending through said ball-joint means, and means for securing said ball-joint means in any desired angular position.

10. In a system for injecting a fluid fuel into a blast furnace having at least one tuyere and means for supplying a blast of hot air to said tuyere comprising an injection lance means for injecting fluid fuel into said air blast and means for supplying fluid fuel to said lance means, said last-mentioned means comprising means for conducting said fuel under pressure from a storage means to said lance means and regulating means in said conducting means for regulating the amount of fuel supplied to said furnace through said lance means, the improvement wherein said injection lance means includes conduit means connected to said conducting means, three-way valve means connected in said conduit means at two of the three ways, steam supply means connected to said conduit means in the third way of said three-way valve means, means for automatically controlling said three-way valve means to prevent oil flow through and to pass steam through said injection lance means upon a fluid fuel pressure failure in the conducting means, and means for automatically controlling said three-way valve means to prevent oil flow through and pass steam through said injection lance means upon failure of said means for supplying said blast of hot air.

References Cited

UNITED STATES PATENTS

| | | | |
|---|---|---|---|
| 2,778,018 | 1/1957 | Strassburger | 266—30 |
| 2,973,194 | 2/1961 | Bryan et al. | 266—30 |
| 2,980,416 | 4/1961 | Strassburger | 266—30 |
| 3,346,249 | 10/1967 | Manny | 266—30 X |
| 3,397,877 | 8/1968 | Strassburger | 266—30 |
| 985,394 | 2/1911 | Case | 266—41 X |
| 3,110,584 | 11/1963 | Sanders et al. | 266—41 X |

FOREIGN PATENTS

Ad. 44,541 11/1934 France.

J. SPENCER OVERHOLSER, Primary Examiner

R. S. ANNEAR, Assistant Examiner

U.S. Cl. X.R.

266—41